(12) United States Patent
Ramer

(10) Patent No.: US 7,191,485 B1
(45) Date of Patent: Mar. 20, 2007

(54) LAWN WASTE SWEEPER WITH RECIRCULATING AIRSTREAM

(75) Inventor: Heber M. Ramer, Harper, KS (US)

(73) Assignee: Harper Industries, Inc., Harper, KS (US)

( * ) Notice: Subject to any disclaimer, the term of this patent is extended or adjusted under 35 U.S.C. 154(b) by 530 days.

(21) Appl. No.: 10/818,540

(22) Filed: Apr. 5, 2004

(51) Int. Cl.
*E01H 1/08* (2006.01)

(52) U.S. Cl. .............................. 15/34; 15/346; 15/347; 15/383

(58) Field of Classification Search ................. 15/345, 15/346, 347, 383; E01H 1/08; A47L 5/14
See application file for complete search history.

(56) References Cited

U.S. PATENT DOCUMENTS

| | | | |
|---|---|---|---|
| 564,013 A | 7/1896 | Furnas | |
| 1,459,968 A | 6/1923 | Bailly | |
| 2,018,791 A | * 10/1935 | Kern | ............................ 15/345 |
| 3,007,191 A | 11/1961 | Braun | |
| 3,512,206 A | 5/1970 | Young | |
| 3,662,427 A | 5/1972 | Hanna | |
| 3,755,851 A | 9/1973 | Williams | |
| 3,977,039 A | 8/1976 | Block | |
| 4,006,511 A | 2/1977 | Larsen | |
| 4,044,422 A | 8/1977 | Larsen | |
| 4,099,290 A | 7/1978 | Hiszpanski | |
| 4,109,341 A | 8/1978 | Larsen et al. | |
| 4,310,944 A | 1/1982 | Kroll et al. | |
| 4,457,043 A | 7/1984 | Oeberg et al. | |
| 4,466,156 A | 8/1984 | Blehert | |
| 4,570,287 A | 2/1986 | Kerschner et al. | |
| 4,660,248 A | 4/1987 | Young | |
| 4,773,121 A | 9/1988 | Young | |
| 4,885,817 A | 12/1989 | Tanase | |
| 5,317,783 A | 6/1994 | Williamson | |
| 5,457,848 A | 10/1995 | Miwa | |
| 5,613,269 A | 3/1997 | Miwa | |
| 5,778,648 A | 7/1998 | Parkes et al. | |
| 5,848,521 A | 12/1998 | Kobayashi | |
| 6,070,290 A | 6/2000 | Schwarze et al. | |
| 6,122,797 A | 9/2000 | Vanderlinden | |
| 6,161,250 A | 12/2000 | Young et al. | |
| 6,263,540 B1 | 7/2001 | Vanderlinden | |

* cited by examiner

*Primary Examiner*—Theresa T. Snider
(74) *Attorney, Agent, or Firm*—Erickson & Kleypas, LLC

(57) ABSTRACT

A vacuum sweeper includes a blower for pulling debris in a stream of air through a vacuum duct, past the blower, out a blower discharge duct and into a hopper. Debris settles to the bottom of the hopper and the air exits the hopper through a return air duct having a discharge opening. The discharge opening is positioned near a vacuum nozzle inlet of the vacuum duct such that dust and debris in the return air stream is pulled back into the vacuum duct. The air discharge opening and the return air duct are sized to be larger than the vacuum nozzle inlet. The speed of the air exiting the discharge opening is thereby reduced increasing the percentage of the return air pulled back through the vacuum nozzle inlet instead of being blown out of the vacuum chamber and into the atmosphere.

10 Claims, 7 Drawing Sheets

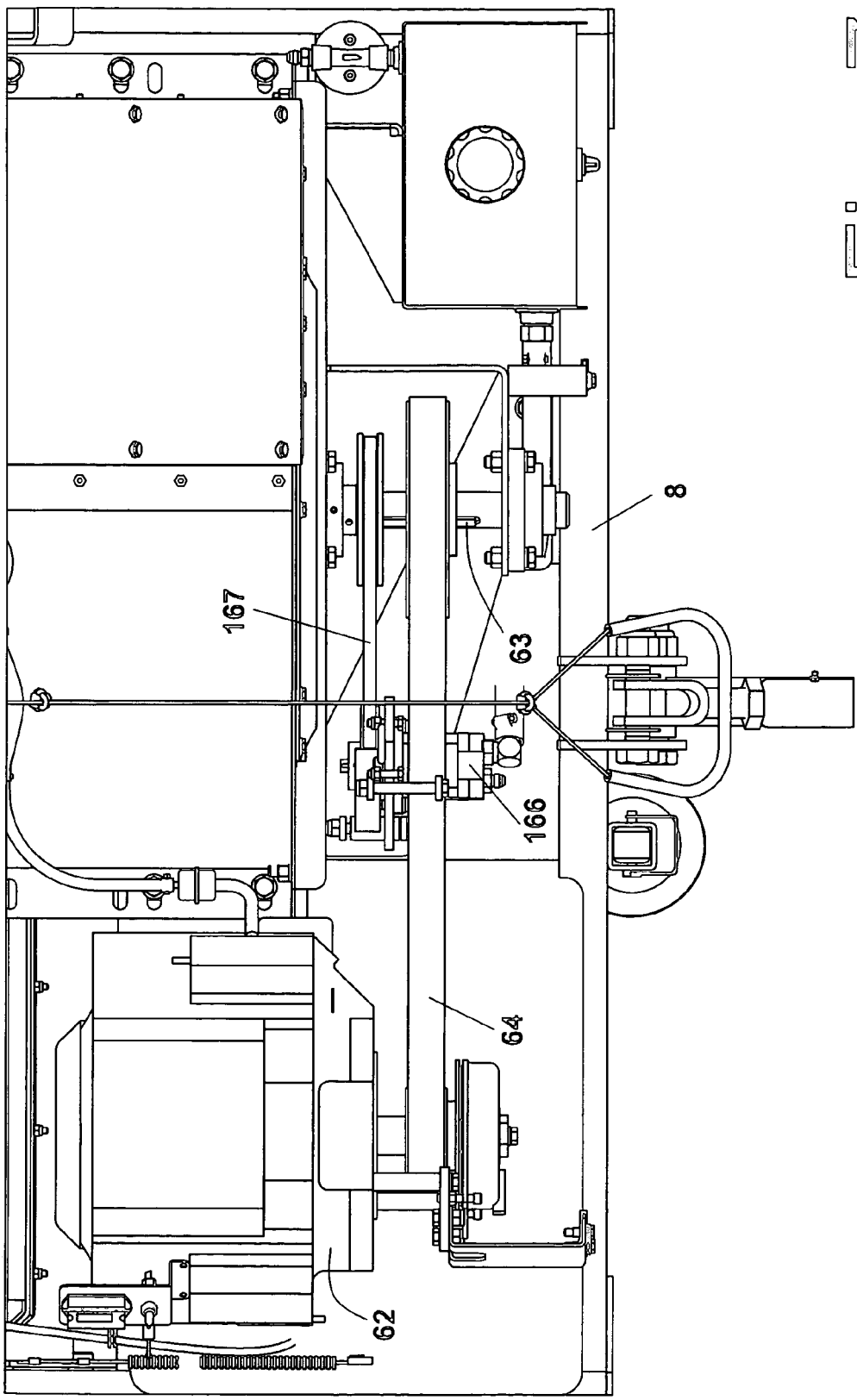

LAWN WASTE SWEEPER WITH RECIRCULATING AIRSTREAM

BACKGROUND OF THE INVENTION

The present invention relates to lawn waste sweepers having a hopper for collecting debris swept from a lawn or related surface in which the airstream carrying the waste material is directed through a debris collection hopper and then back to a suction zone of the sweeper.

Vacuum sweepers adapted to collect lawn debris are known in the art. Such sweepers typically have an inlet nozzle or duct connected to the suction side of a blower. Lawn debris is pulled by the blower through the inlet and then discharged past the blower through a discharge duct and into a hopper. The debris settles to the bottom of the hopper and the air is typically vented into the air through screened openings in the top of the hopper. Although these systems are typically adequate for collecting lawn waste, the discharged air can produce a considerable dust cloud, particularly in dry conditions.

In street sweepers and the like it is known to circulate the airstream carrying the waste material through a filter and then back to the area in which the inlet is located to discharge the air in the vicinity of the nozzle or inlet. The air is discharged under pressure through a restricted orifice in the form of a jet to assist in loosening and lifting debris on the surface to be cleaned. For example, U.S. Pat. No. 5,457,848 to Miwa discloses a recirculating type cleaner in which the outlet is located within the region of the suction port. The outlet is constricted in such a manner that the air is discharged in the form of a jet to loosen debris on the surface to be cleaned. Such sweepers appear intended for use as street sweepers or the like in cleaning hard and flat surfaces such as roads and parking lots where dust control is not the primary concern, rather dislodging material stuck to the surface to be cleaned is the primary concern. However, use of a jet of air directed at the surface of a lawn or the like is likely to create an undesirable amount of dust which would overwhelm the intake capacity of the suction inlet such that the dust would be discharged into the atmosphere.

Other references show similarly sized duct work for the suction inlet and the air discharge outlet, wherein the inlet and outlet are mounted laterally on opposite sides of a suction hood or the like, such as with the sweeper shown in U.S. Pat. No. 4,099,290 to Hiszpanski.

There remains a need for a lawn waste vacuum sweeper which is effective at collecting a wide variety of lawn waste while reducing the amount of dust and particulate matter discharged into the atmosphere by the sweeper.

SUMMARY OF THE INVENTION

The present invention relates to a vacuum sweeper for collecting debris from a surface such as the ground. The sweeper uses a blower for pulling debris in a stream of air through a vacuum duct past the blower, through a blower discharge duct and into a hopper. The debris settles to the bottom of the hopper and the air is directed out of the hopper through an air discharge duct. The air discharge duct opens at an air discharge opening which is positioned in close proximity to a vacuum nozzle inlet of the vacuum duct such that a significant portion of any dust or debris in the return air stream is pulled back into the vacuum duct and is not vented to the atmosphere.

The air discharge opening and a decompression section of the air discharge duct extending immediately upstream of the air discharge opening are sized to be larger than the vacuum nozzle inlet such that the speed of the air exiting the air discharge opening is reduced relative to the airspeed of air entering the vacuum nozzle inlet. The reduction in air speed of the return air exiting the air discharge opening increases the percentage of the return air that is pulled back through the vacuum nozzle inlet instead of being blown out of the vacuum chamber and into the atmosphere, thereby reducing the amount of dust and particulate matter vented into the atmosphere.

The air discharge opening is larger in cross-sectional area than the vacuum nozzle inlet and preferably approximately three or four times larger in cross-sectional area. The cross-sectional area of the decompression section of the return air duct is preferably approximately one third larger than the cross-sectional area of the air discharge outlet and preferably at least four or six times greater than the cross-sectional area of the vacuum nozzle inlet.

A cylindrical brush is rotatably mounted within the vacuum chamber on an axis extending across the width of the vacuum chamber. The brush includes radially outward projecting bristles which rotate toward the vacuum nozzle inlet as the bristles rotate across the ground to sweep debris toward the vacuum nozzle inlet.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 7 is an enlarged and fragmentary top plan view of the debris collection apparatus showing a power supply system.

DETAILED DESCRIPTION OF THE INVENTION

Figure 1:
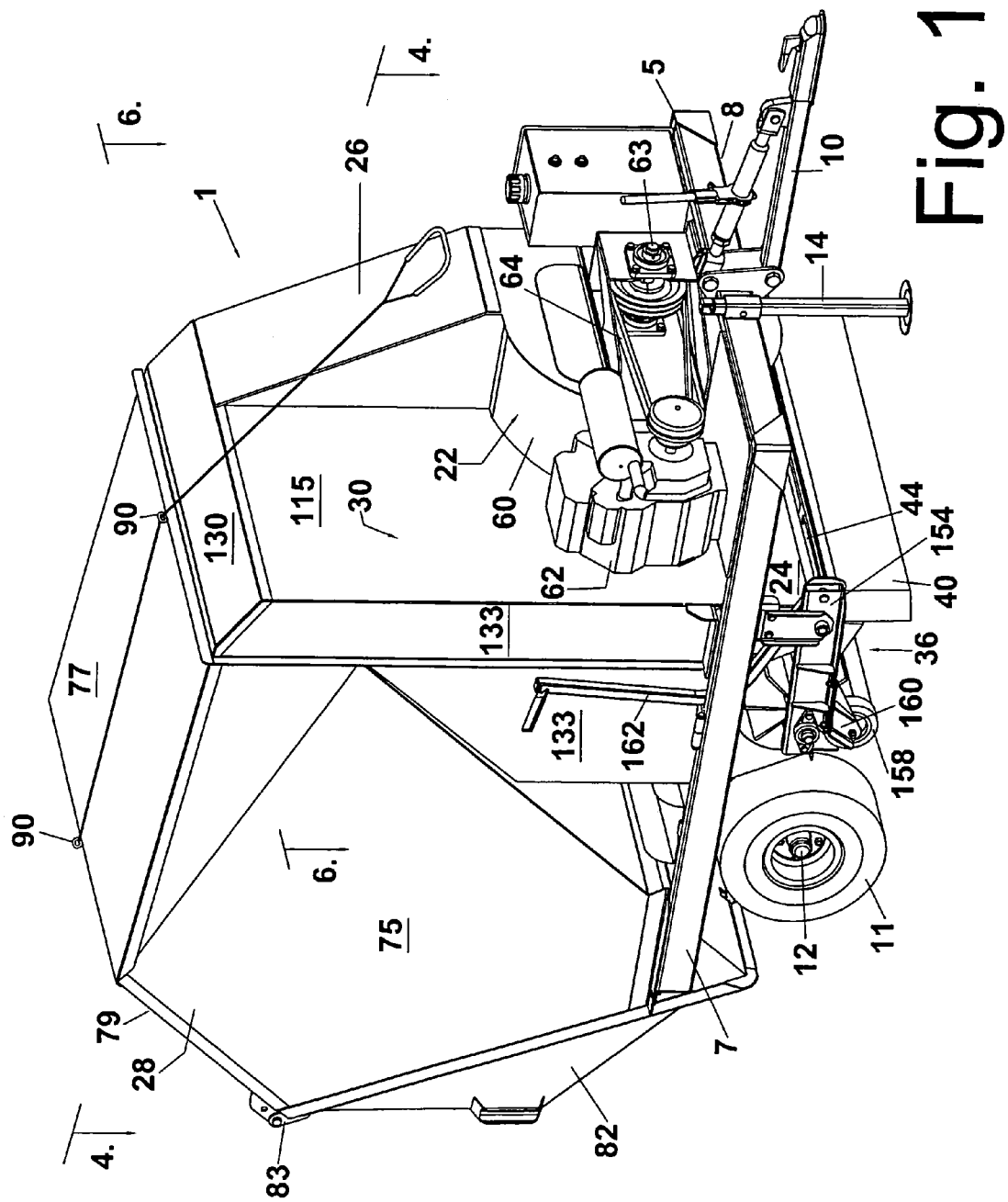
FIG. 1 is a perspective view of a debris collection apparatus.
Figure 2:
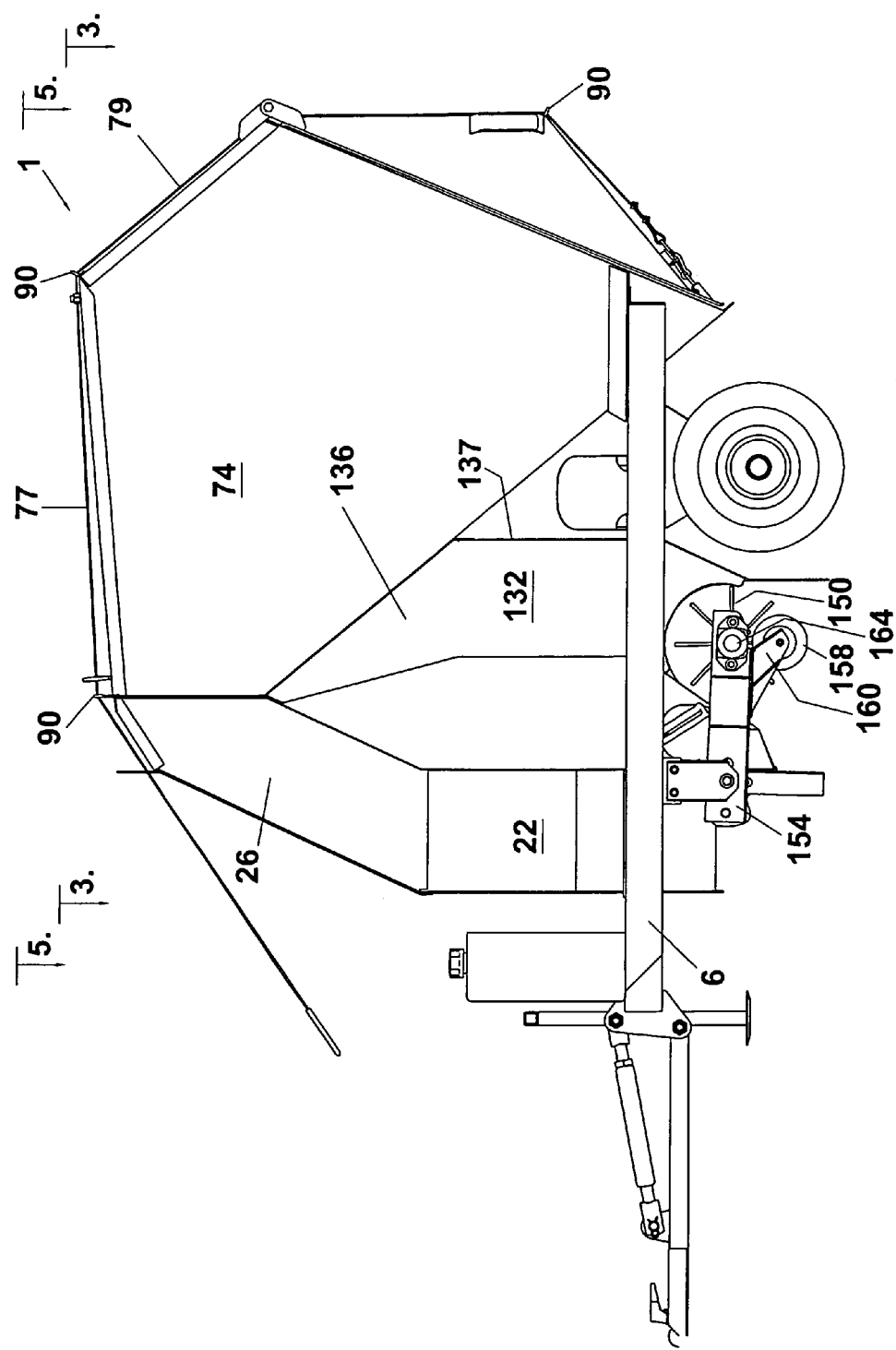
FIG. 2 is a plan view of a right side of the debris collection apparatus.
Figure 3:
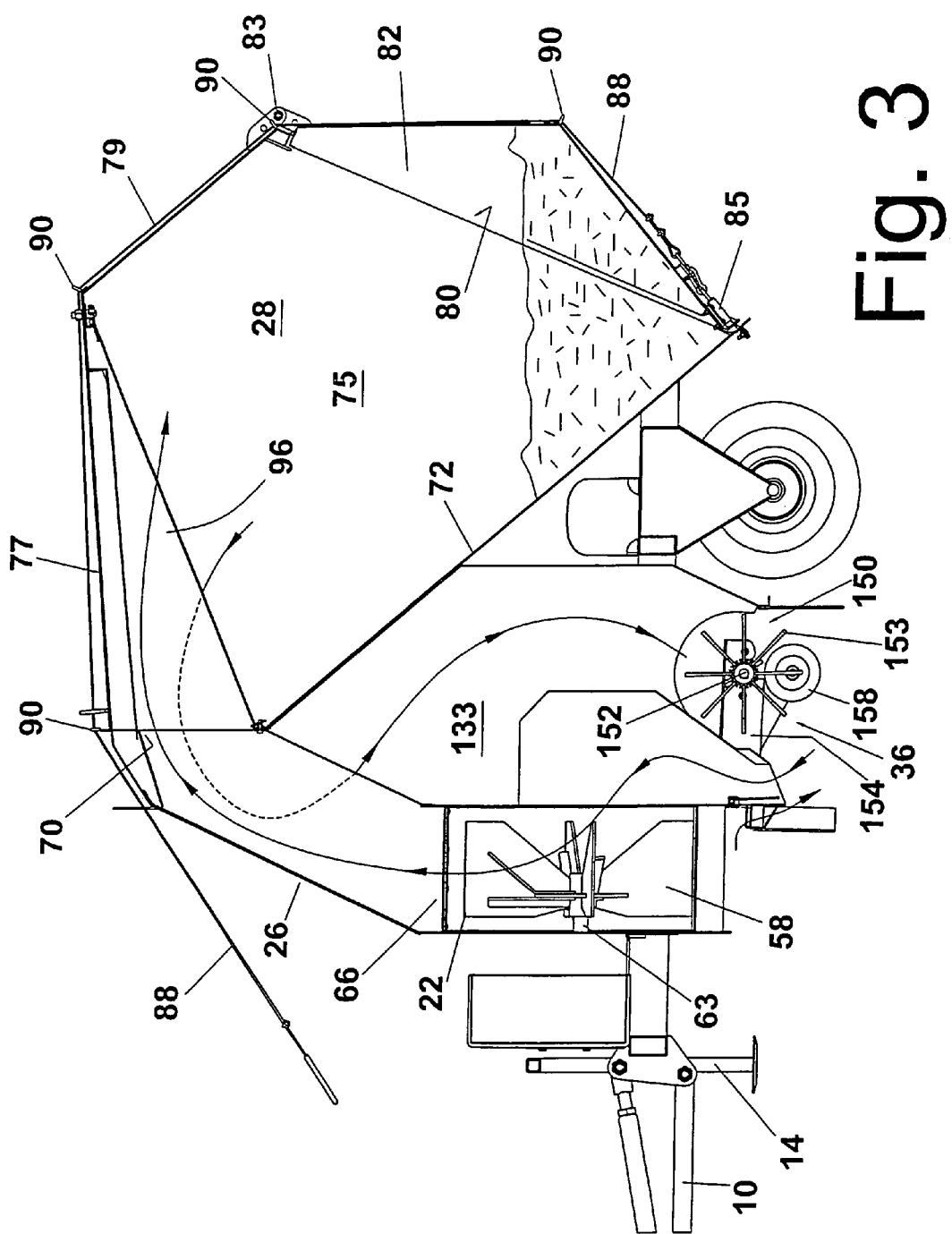
FIG. 3 is a fragmentary, cross-sectional view taken generally along 3—3 of FIG. 2.
Figure 4:
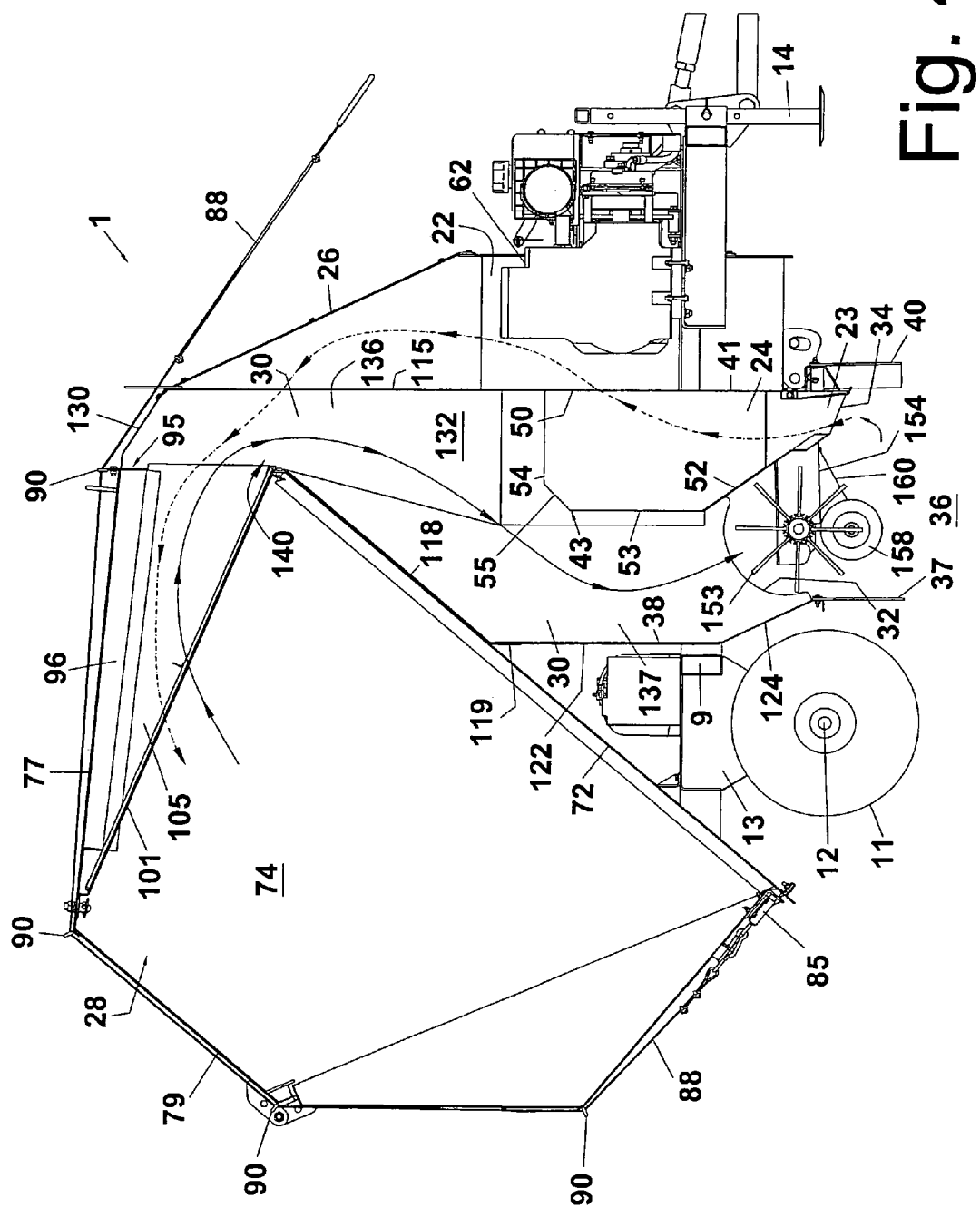
FIG. 4 is a fragmentary, cross-sectional view taken generally along line 4—4 of FIG. 1.
Figure 5:
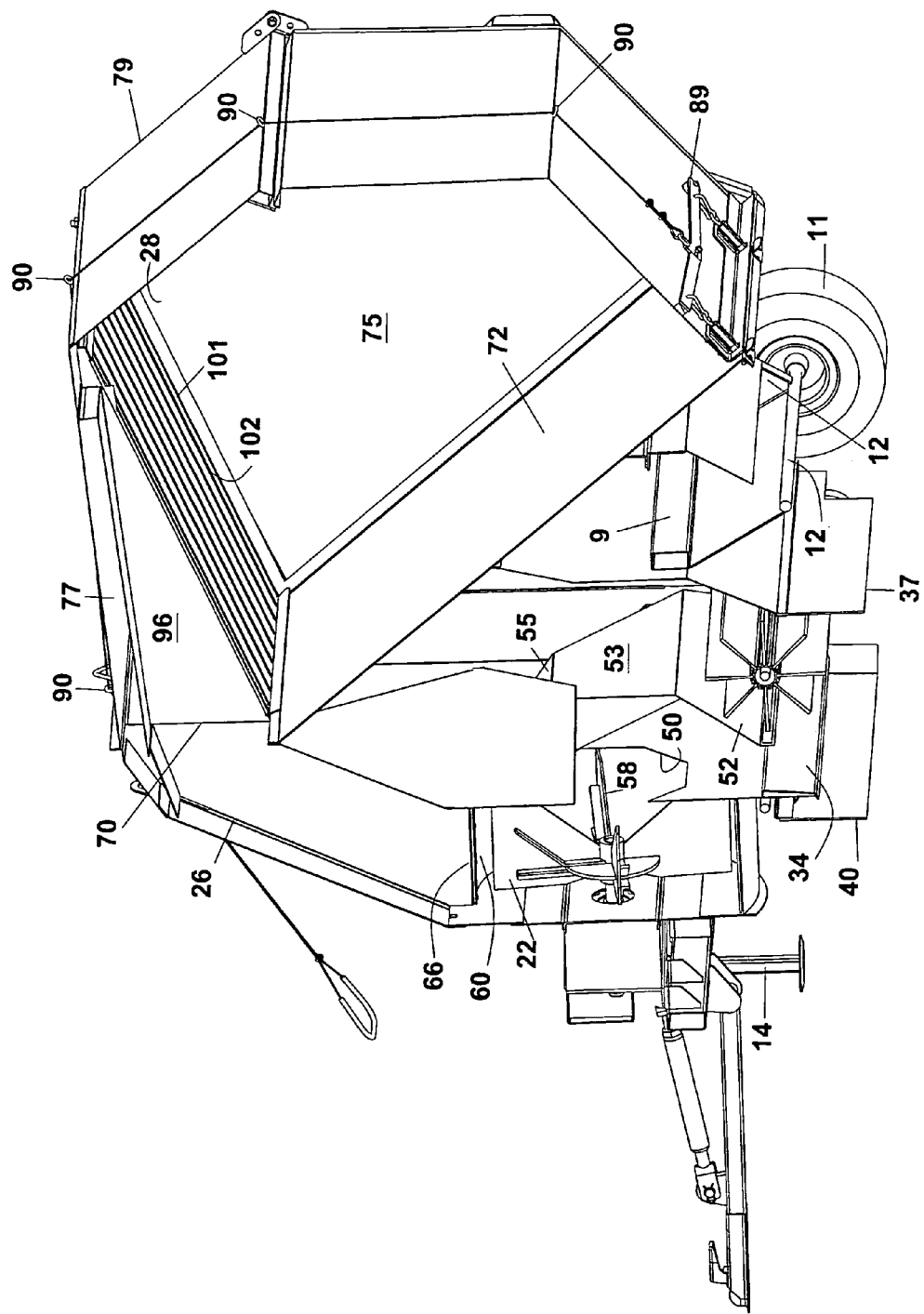
FIG. 5 is a cross-sectional view taken generally along line 5—5 of FIG. 2 and shown in perspective.
Figure 6:
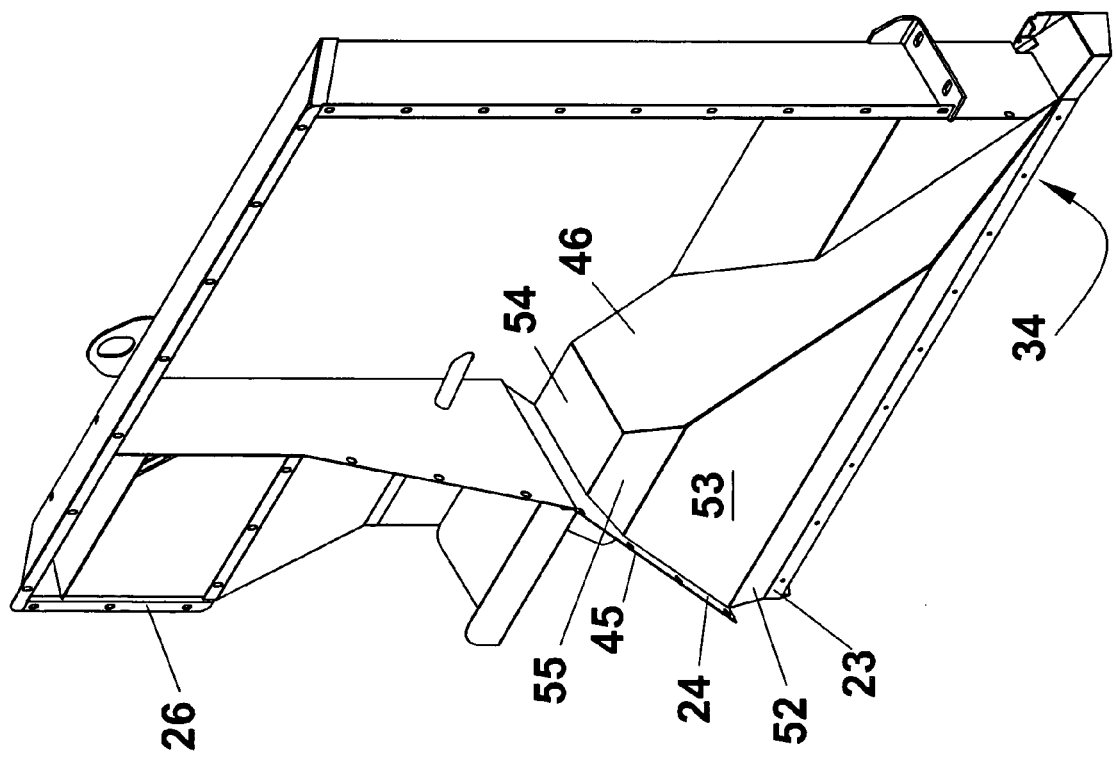
FIG. 6 is a fragmentary cross-sectional view taken generally along line 6—6 of FIG. 1 and shown in perspective.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 refers to a vacuum sweeper of the present invention. The vacuum sweeper 1 shown is adapted to be towed behind a towing vehicle, such as a tractor (not shown) and is particularly well adapted for use in collecting debris such as leaves, lawn clippings, thatch and core aeration plugs from large turf type surfaces as found golf courses, parks, office parks, highway right of ways and the like.

The sweeper 1 includes a main frame 5 which comprises a pair of side frame members 6 and 7 which are connected together by front frame member 8 and rear frame member 9. A tongue 10 for securing the sweeper 1 to a tow vehicle such as a tractor or the like is connected to the front frame member 8. The frame 5 is supported above the ground by a pair of wheels 11 rotatably mounted on axle 12 which is connected to the frame 5, proximate the rear frame member 9, by axle mounts 13. A jack 14 is mounted on the front frame member 8 for selectively supporting the tongue 10 above the ground when the sweeper 1 is not connected to a tow vehicle.

A fan or blower 22 mounted near the front of the frame 5, pulls lawn debris from the ground in a stream of air through a vacuum nozzle 23 at the lower end of a vacuum duct 24 formed on a suction side of the blower 22 and then blows the debris out the discharge side of the blower 22 through a blower discharge duct 26 and into a hopper 28 mounted on the frame 5 toward the rear thereof. Most of the debris settles out of the stream of air into the hopper 28. The air stream along with any remaining dust and debris entrained therein is then vented out of the hopper 28 though a return air duct 30 and out an air discharge opening 32 in the duct 30.

The air discharge opening 32 is sized and positioned in close proximity to a vacuum nozzle inlet 34 formed in the vacuum nozzle 23 such that the air stream along with any remaining dust and debris entrained therein is recycled back through the hopper 28 instead of being vented to the atmosphere. As will be discussed in more detail hereafter, the cross-sectional area of the air discharge opening 32 and the portion of the return air duct 30 proximate discharge opening 32 are sized larger than the cross-sectional area of the vacuum nozzle inlet 34 to reduce the air speed of the return air stream relative to the speed of the air being pulled into the sweeper at the vacuum nozzle inlet 34 to help ensure that most of the return air and debris entrained therein is pulled back through the vacuum nozzle inlet 34 and recycled through the sweeper 1. As used herein, references to the cross-sectional area of an inlet, outlet or portion of a duct generally refer to the cross-sectional area taken transverse or perpendicular to the path of air flowing through the duct or out the noted inlet or outlet.

The air discharge opening 32 of return air duct 30 and the vacuum nozzle inlet 34 of the vacuum nozzle 23 both open into an area 36 that may be referred to as a vacuum chamber, suction chamber, vacuum hood, suction zone, debris pick-up zone or the like. The vacuum chamber 36 extends across the width of the sweeper 1 in front of ground wheels 11. A rear vacuum chamber skirt or wall 37 secured to and depending from a rear wall 38 of the return air duct 30 extends along and defines a rear edge of the vacuum chamber 36. A front vacuum chamber skirt or wall 40 attached to and extending downward from a front panel 41 of the vacuum duct 24 extends along and defines a forward or leading edge of the vacuum chamber 36. The front vacuum chamber skirt 40 is supported in spaced relation in front of the front panel 41 of vacuum duct 24 such that one or more make-up air intake gaps 44 are formed between the front skirt 40 and the front panel 41 of vacuum duct 24.

The vacuum duct is formed from the front panel 41, a rear panel assembly 43 and side panels 45 and 46. Front panel 41 is flat and extends generally vertically in closely spaced relationship behind the blower 22. A blower inlet opening 50 is formed in the front panel 41 of the vacuum duct 24 toward the upper end thereof. The rear panel assembly 43 includes a lower rear panel 52 that angles rearward away from the front panel 41 as it extends upward from the vacuum nozzle inlet 34 which is formed between the front panel 41 and the lower rear panel 52. A vertical panel 53 extends vertically upward from an upper end of lower rear panel 52 and is connected to a top panel 54 by an angled corner panel 55. The top panel 54 extends generally horizontally and connects to the front panel 41 just above an upper edge of the blower inlet opening 50 in front panel 41. The side panels 45 and 46 angle inward from the vacuum nozzle inlet 34 toward an upper end of the vacuum duct 24. The vacuum duct 24 is shaped to channel the air pulled through the elongate vacuum nozzle inlet 34 to the relatively round blower inlet opening 50.

The blower 22, which is mounted in front of the vacuum duct 24, generally comprises an impeller 58 mounted within a blower housing 60. The impeller 58 is driven by a gasoline engine 62 which is connected to a shaft 63 of the impeller 58 by belt 64. The blower housing 60 is formed around the impeller 58, in front of the vacuum duct 24 and includes a discharge outlet 66 on the discharge side of the blower 22. The discharge outlet 66 is generally square or rectangular in cross-section. The blower discharge duct 26 is flow connected at a first or lower end to the blower housing 60 at the discharge outlet 66 and at a second end to the hopper 28 at a hopper inlet 70 formed in a front end of the hopper 28. The blower discharge duct 26 is generally rectangular in cross-section.

The hopper 28 which is connected to frame 5, includes a downwardly and rearwardly sloping floor 72, side walls 74 and 75, top panel 77 and rear panel 79. A dump opening 80 is formed at the rear of the hopper 28 between the sidewalls 74 and 75 and between the rearmost and lower edges of the rear panel 79 and floor 72. A hopper door or dump door 82 is pivotally mounted to the hopper 28 on hinges 83 secured to the rear panel 79 along the lower rearmost edge thereof. The hopper door 82 is preferably shaped to provide additional holding or storage capacity for the hopper 28. For example, as shown in drawings for the preferred embodiment, the door 82 may be described as having a triangular box shape.

The lower rearmost edge of the rear panel 79 to which the door 82 is pivotally connected is spaced rearward of the rear, lowermost edge of the hopper floor 72 such that the door 82 hangs open relative to the dump opening 80 of the hopper 28 if not secured in closed relationship with the dump opening 80. When the door 82 is pushed into closed relationship with the dump opening 80 spring loaded catches 85 engage the floor 72 of the hopper 28 to hold the door 82 closed. A door release cable 88 is connected to a catch release mechanism 89 for use in releasing the catches 85 to permit the door 82 to swing open. The door release cable 88 is threaded through eyelets 90 and over the rear panel 79 and top panel 77 of the hopper 28. The distal end of the cable 88 is preferably positionable proximate the operator's seat of the tow vehicle. The operator can thereby pull on the door release cable 88 to open the door. By pulling on the door release cable 88 further, the operator can cause the door 82 to pivot open to a greater degree than occurs due to gravity to facilitate dumping of the contents of the hopper 28. The floor 72 is sloped to a sufficient degree to permit the contents of the hopper 28 to slide out through the dump opening 80 due to gravity when the door 82 is opened.

A hopper outlet 95 is formed across the front of the hopper 28 between a front, upper edge of the sloped floor 72 and the front edge of the hopper top panel 77. The hopper outlet 95 extends adjacent the hopper inlet 70 and is separated therefrom by a baffle 96. The baffle 96 depends from the hopper top panel 77. The baffle 96 is generally triangular in shape with a lower edge of the baffle 96 extending from the forwardmost, upper edge of the floor 72 to the corner formed between the hopper top panel 77 and rear panel 79.

A grate, screen or filter 101 is secured in the hopper 28 across the gap formed between the lower edge of the baffle 96 and the hopper sidewall 75 which extends on the side of the hopper 28 opposite the hopper inlet 70. Air passing out of the hopper outlet 95 must pass through openings 102 in the grate 101. As the air passes through the openings 102 in the grate 101, debris that is entrained in the air stream that strikes the grate 101 is typically knocked out of the air stream and settles into a pile of debris which collects in the bottom of the hopper 28. The volume or space formed above the grate 101, below the hopper top panel 77 and downstream of the hopper outlet 95 may generally be referred to as the hopper discharge head space 105.

The hopper outlet 95 opens into and is flow connected to the return air duct 30 at an upper or first end 110 of the duct 30. The front of the return air duct 30 is formed in part by a front panel 115 which is formed from the same panel or sheet of metal which forms the front panel 41 of the vacuum duct 24. An upper portion of the sheet metal or panel forming the hopper floor 72 also forms an upper portion 118 of a rear wall or panel 119 of return air duct 30. The rear wall or panel 119 of return air duct 30 includes a center portion 122 extending vertically downward from a lower end of the upper portion 118 of the rear wall 119 in spaced relation behind the vacuum duct 24.

The rear wall 119 further includes a lower portion 124 extending downward from a lower end of the center portion 122 and at an angle toward the front of the sweeper 1. The lower portion 124 of the return air duct 30 angles toward the front extending in roughly parallel relation to the lower rear panel 52 of the vacuum duct 24.

The return air duct 30 further includes a top panel 130 and left and right side walls 132 and 133. The return air duct top panel 130 extends between the front edge of the hopper top panel 77 to the upper edge of the return air duct front panel 115.

The right side wall 133 extends vertically along the right side of the sweeper 1, generally in planar alignment with the right sidewall 75 of the hopper 28. The right sidewall 133 extends between the front and rear walls 115 and 119 from the top panel 77 down to the lower edge of the front and rear walls 115 and 119.

The return air duct left side wall 132 includes an upper section or panel 136 and a lower section or panel 137. The upper section 136 extends vertically between the front and rear walls 115 and 119 along the left side of the hopper outlet 95 in planar alignment with the baffle 96 which separates the hopper inlet 70 from the hopper outlet 95. The upper section 136 of the return air duct left side wall 132 extends vertically from the top panel 130 downward toward the vacuum duct top panel 53.

The lower section 137 of the return air duct left side wall 132 extends outward at a downwardly sloping angle from just above the vacuum duct top panel 53 to the lower left edges of the return air duct front and rear walls 115 and 119. The space between the lower end of the lower portion 124 of rear wall 119 of return air duct 30 and the lower rear panel 52 of the vacuum duct 24 generally defines the air discharge opening 32 which extends across the entire width of the sweeper 1. As noted previously, the air discharge opening 32 opens into the vacuum chamber 36.

The return air duct 30 and the air discharge opening 32 are generally sized to have a larger cross-sectional area taken transverse to the direction of travel of the airstream, than the cross-sectional area of the vacuum nozzle inlet 34. The increase in cross-sectional area is intended to slow down the air speed of the air exiting the return air duct 130. Slowing down the air speed of air exiting the return air duct 130 is believed to help ensure that the return air stream does not overwhelm the suction into the vacuum nozzle inlet 34 and thereby helping to ensure that any dust or debris carried in the return air stream is pulled back into the sweeper 1 through the vacuum duct 24.

The narrowest part of the return air duct 30 is a gap or restriction 140 between the upper edge of the hopper floor 72 and the return air duct front wall 115. The cross-sectional area of this gap or restriction 140 is approximately one and one half times the cross-sectional area of the vacuum nozzle inlet 34. Below the restriction 140, the cross-sectional area of the return air duct 30 (measured transverse to the direction of flow of air through the duct 30) expands to approximately four to six times the cross-sectional area of the vacuum nozzle inlet 34 as the upper portion 118 of the return air duct rear wall 119 slopes rearward away from the front panel 115. This expanded area may be referred to as an airspeed reduction section.

Below the level of the vacuum duct top panel 53, the cross-sectional area of the return air duct 30 is reduced by the area occupied by the vacuum duct 24. However, the reduction in cross-sectional due to the vacuum duct 24 is offset somewhat by the additional area created as the left sidewall lower section 137 slopes outward. Overall, the average cross-sectional area of that portion of the return air duct 30 (measured transverse to the direction of air flow through the duct) extending adjacent to the rear wall center and lower portions 122 and 124 and out the discharge opening 32 is somewhat smaller than the cross-sectional area of the return air duct 30 at its widest point proximate the transition from the rearwall upper portion 118 and the rear wall center portion 122. For example, in the embodiment shown in the drawings, the cross-sectional area of the return air duct 30 is approximately five times greater than the vacuum nozzle inlet 34 and the cross-sectional area of the air discharge opening 32 is approximately four times greater than the cross-sectional area of the vacuum nozzle inlet 34.

The increase in cross-sectional area of the return air duct 30 is intended to slow down the speed of the air returning to the vacuum chamber 36. Pressure measurements were taken at various locations on the sweeper 1. At the vacuum nozzle inlet 34, the suction was measured at 3 inches of water. Inside of the hopper 28 the pressure was measured at 5 inches of water and in the area between the grate 101 and the restriction 140 the pressure was measured at 3 inches of water. At the air discharge opening 32 the pressure was measured at 0 inches of water. These pressure measurements generally confirm that the speed of the air exiting the discharge opening 32 is significantly reduced relative to the speed of the air being pulled into the vacuum nozzle inlet 34.

A brush 150 is rotatably mounted in the vacuum chamber 36 on an axle, shaft or hub 152 extending across the width of the sweeper 1. The brush includes bristles 153 extending radially outward from the axle 152. The axle 152 is rotatably mounted on a pair of support arms 154 which are pivotally connected to side frame members 6 and 7. A brush support wheel 158 is connected to each support arm 154 by a wheel mount 160. The support wheels 158 support the brush above the surface to be cleaned or swept by a selected distance, which is adjustable. For example, when the sweeper is used to collect leaves off of a lawn, the position of the support wheels 158 on the mounts 160 is selected to support the brush 150 so that the tips of the brush bristles 153 pass just above the top of the grass and engage the leaves supported on the grass but not the grass itself. As the brush support wheels 158 follow the contours of the ground, the brush 150 pivots relative to the frame 5 accordingly. The brush support wheels 158 may be pivoted out of engagement with and held above the ground by a locking lever 162 which is connected to one of the support arms 154. The brush support wheels 158 are preferably raised and held above the ground when the sweeper 1 is being transported between or to areas to be swept.

The brush 150 is rotatably driven by an hydraulic motor 164 connected to brush axle 152. The hydraulic motor 164 is powered by hydraulic fluid circulated through hoses connected to an hydraulic pump 166. The hydraulic pump 166 is driven by a belt 167 which is connected to a pulley on the impeller shaft 63 which is in turn driven by the engine 62. Clutch assemblies, not shown, are included to permit the operator to selectively start or stop the impeller 58 or the brush 150 from rotating.

The brush 150 is rotated such that the bristles 153 rotate toward the front of the sweeper 1 or toward the vacuum nozzle inlet 34 as they pass under the brush axle 152. The bristles 153 function to lift debris off of the ground and throw the debris forward toward the vacuum nozzle inlet 34 so that the debris is more readily entrained in the air sucked into the vacuum duct 24. In addition, the bristles 153 tend to push or direct the return air and any debris contained therein from the air discharge outlet 32 and back toward the vacuum nozzle inlet 34 thereby reducing the amount of return air and entrained debris that escapes out the sides of the vacuum chamber 36.

As shown in the drawings, lower edges of the left and right sidewalls 132 and 133 are curved to generally extend above and around the path of travel of the tips of the brush bristles 153. Although the sides of vacuum chamber 36 are generally open, the action of the brush bristles 153 in directing air and debris exiting the return air duct 130 back toward the vacuum nozzle inlet 134 functions to keep the return air and debris entrained therein from escaping out the sides of the vacuum chamber 36. It is foreseen that the sweeper 1 could be utilized without the brush 150. If the sweeper 1 does not utilize a brush 150, the lower edges of the left and right sidewalls 132 and 133 of the return air duct 130 preferably extend down to the same level as the vacuum nozzle inlet 34 and the air discharge opening 32 to help restrain the return air stream and any debris entrained therein from escaping out from underneath vacuum chamber 36.

It is to be understood that while certain forms of the present invention have been illustrated and described herein, it is not to be limited to the specific forms or arrangement of parts described and shown.

What is claimed and desired to be secured by Letters Patent is as follows:

1. A vacuum sweeper movable over the ground to collect debris on the surface of the ground and comprising:
   a) a hopper having a hopper inlet opening and a hopper outlet opening formed therein;
   b) a blower having a suction side and a discharge side;
   c) a vacuum duct having a vacuum nozzle inlet formed at a first end thereof and being flow connected to said suction side of said blower at a second end thereof, said vacuum nozzle inlet opening into a vacuum chamber positioned in closely spaced relation to the ground;
   d) a blower discharge duct flow connected at a first end thereof to said discharge side of said blower and at a second end thereof to said hopper inlet opening; and
   e) a return air duct flow connected to said hopper outlet opening at a first end thereof and having an air discharge opening at a second end thereof, said air discharge opening feeding into said vacuum chamber; wherein
   f) said air discharge opening is at least approximately three times greater in cross-sectional area than said vacuum nozzle inlet.

2. The vacuum sweeper as in claim 1 wherein the air discharge opening is at least approximately four times greater in cross-sectional area than said vacuum nozzle inlet.

3. The vacuum sweeper as in claim 1 wherein said return air duct includes an airspeed reduction section extending upstream of said air discharge opening and which is at least approximately four times larger in cross-sectional area than said vacuum nozzle inlet.

4. The vacuum sweeper as in claim 1 wherein said return air duct includes an airspeed reduction section extending upstream of said air discharge opening and which is at least approximately one third larger in cross-sectional area than said air discharge opening.

5. The vacuum sweeper as in claim 2 wherein said return air duct includes an airspeed reduction section extending upstream of said air discharge opening and which is at least approximately five times larger in cross-sectional area than said vacuum nozzle inlet.

6. The vacuum sweeper as in claim 1 further comprising a filter extending across said hopper outlet opening.

7. The vacuum sweeper as in claim 1 wherein said vacuum nozzle inlet and said air discharge opening each extend substantially across the width of said vacuum sweeper with said vacuum nozzle inlet extending in front of said air discharge opening.

8. The vacuum sweeper as in claim 7 wherein said vacuum chamber is formed by a front wall secured to said vacuum sweeper in front of said vacuum nozzle inlet and a rear wall secured to said vacuum sweeper behind said air discharge opening.

9. The vacuum sweeper as in claim 7 further comprising:
   a) a cylindrical brush rotatably mounted within said vacuum chamber on an axle extending across the width of said vacuum chamber; said brush having radially outward projecting bristles which rotate toward said vacuum nozzle inlet as said bristles rotate below said axle and over the ground; and wherein
   b) said air discharge opening opens into said vacuum chamber from above said cylindrical brush.

10. A vacuum sweeper movable over the ground to collect debris on the surface of the ground and comprising:
   a) a hopper having a hopper inlet opening and a hopper outlet opening formed therein;
   b) a blower having a suction side and a discharge side;
   c) a vacuum duct having a vacuum nozzle inlet formed at a first end thereof and being flow connected to said suction side of said blower at a second end thereof, said vacuum nozzle inlet opening into a vacuum chamber positioned in closely spaced relation to the ground and extending substantially across the width of said sweeper;
   d) a blower discharge duct flow connected at a first end thereof to said discharge side of said blower and at a second end thereof to said hopper inlet opening;
   e) a return air duct flow connected to said hopper outlet opening at a first end thereof and having an air discharge opening at a second end thereof, said air discharge opening feeding into said vacuum chamber; and f) a cylindrical brush rotatably mounted within said vacuum chamber on an axle extending substantially across the width of said vacuum chamber; said brush having radially outward projecting bristles which rotate toward said vacuum nozzle inlet as said bristles rotate below said axle and over the ground; and wherein g) said vacuum nozzle inlet and said air discharge opening each extend substantially across the width of said vacuum sweeper with said vacuum nozzle inlet extending in front of said air discharge opening;

f) said air discharge opening is at least approximately three times greater in cross-sectional area than said vacuum nozzle inlet;

h) said return air duct includes an airspeed reduction section extending upstream of said air discharge opening and which is at least approximately three times larger in cross-sectional area than said vacuum nozzle inlet; and i) said air discharge opening opens into said vacuum chamber from above said cylindrical brush.

* * * * *